United States Patent Office 3,448,016
Patented June 3, 1969

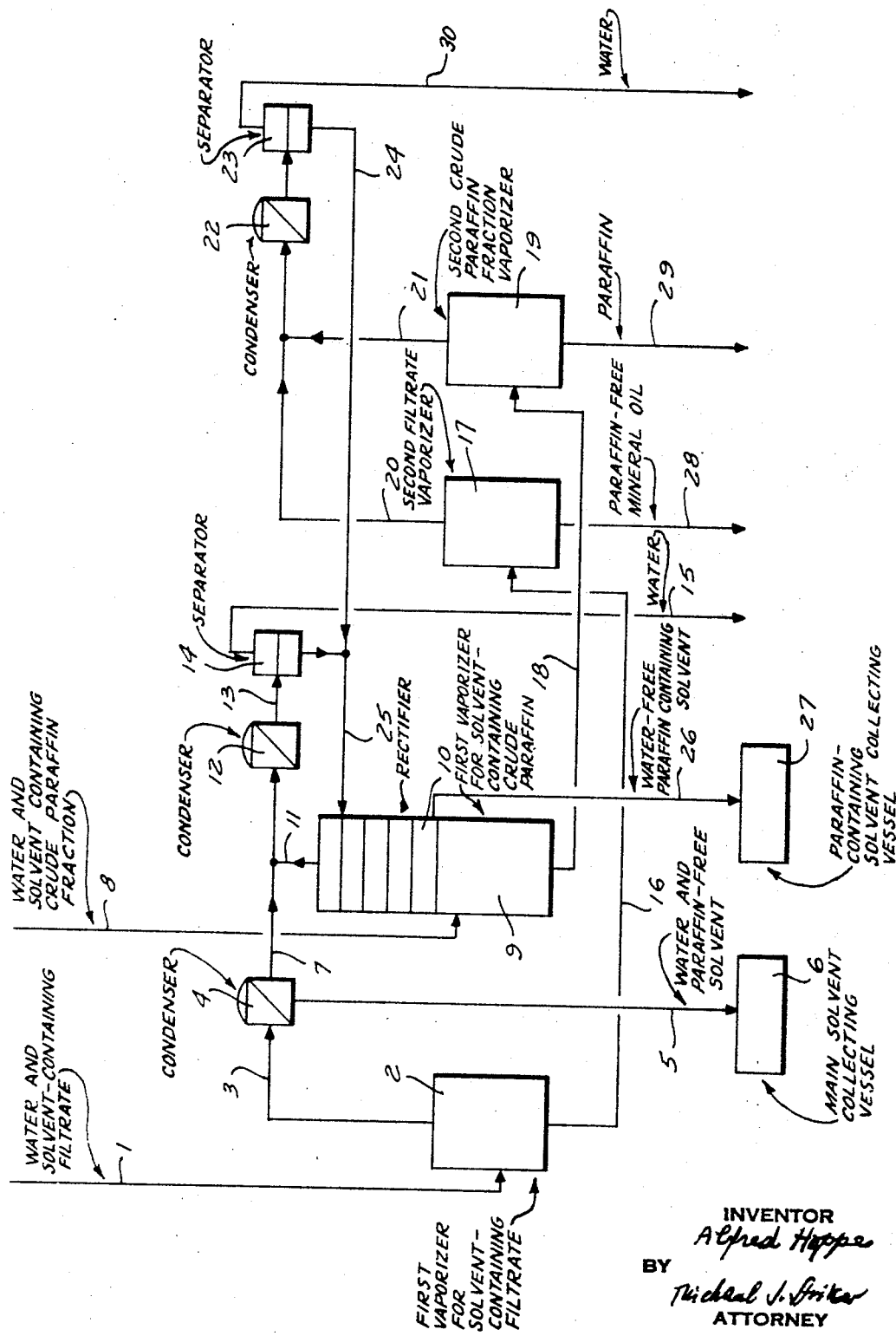

3,448,016
METHOD OF RECOVERING PURE SOLVENTS
USED IN DEWAXING MINERAL OILS AND
THE LIKE BY MULTISTAGE DISTILLATION
OF SEPARATE SOLVENT STREAMS
Alfred Hoppe, Frankfurt am Main, Germany, assignor to Edeleanu Gesellschaft m.b.H., Frankfurt am Main, Germany
Filed Feb. 1, 1967, Ser. No. 613,200
Claims priority, application Germany, Feb. 12, 1966, E 31,034
Int. Cl. B01d 3/38, 3/14; C07c 17/38
U.S. Cl. 203—76           5 Claims

ABSTRACT OF THE DISCLOSURE

Lower chlorinated hydrocarbons which had been used as solvents in the dewaxing of mineral oils and the like are recovered in water-free and paraffin-free form by diluting the mineral oils which are to be dewaxed with dichloroethane and/or dichloromethane or the like, cooling the thus-obtained solutions whereby paraffin will precipitate, and filtering the thus obtained mixture. Thereby a filtrate will be formed consisting of paraffin-free mineral oil and lower chlorinated hydrocarbon solvent. This filtrate will additionally contain water since the initial mineral oil always contains a small fraction of water. The filter residue or crude paraffin fraction will consist essentially of the precipitated paraffin, the latter containing solvent and some water also derived from the water content of the initial mineral oil or the like. Recovery of the solvent is carried out by separate evaporation of volatile constituents from the filtrate and the crude paraffin fraction. Evaporation of the filtrate will yield water-containing, paraffin-free chlorinated hydrocarbon vapors which are partially condensed. The thus-obtained condensate represents the major portion of the initially introduced chlorinated hydrocarbons in water-free and paraffin-free form. The uncondensed fraction of these vapors consists of the lower boiling azeotropic mixture of chlorinated hydrocarbons and water. This uncondensed portion is combined with the vapors obtained by evaporation of the crude paraffin fraction which latter evaporation is carried out in a rectifying column. The thus combined vapors are subjected to complete condensation. In the thus-obtained condensate separation of water from water-containing chlorinated hydrocarbons will take place. The water is removed and the still water-containing chlorinated hydrocarbons are introduced as reflux at the head of the above-mentioned rectifying column. At the bottom of the rectifying column accrue chlorinated hydrocarbons recovered from the crude paraffin fraction. This relatively small proportion of the originally introduced chlorinated hydrocarbons is free of water but not free of paraffin and may be recycled for the dewaxing of subsequent portions of mineral oils and the like.

BACKGROUND OF THE INVENTION

The present invention is concerned with a method for the recovery of dry and paraffin-free solvents, particularly chlorinated hydrocarbons which were used as solvents in the dewaxing or de-paraffination of mineral oils, tars, distillation products thereof and the like, whereby the solvents are recovered by partial evaporation, preferably steam distillation of the solvents-containing end products of the dewaxing process, and the evaporation is carried out in two or more stages, followed by condensation and, as will be more fully described, rectification.

It is important in the process of dewaxing mineral oils and the like with the help of solvents to recover the solvents as completely as possible. Conventionally this is attempted by steam distillation of the mineral oil or the like from which paraffin has been removed, the so-called filtrate, on the one hand, and steam distillation of the crude paraffin fraction, on the other hand. The solvent vapors are then condensed and the thus liquified solvents reintroduced into the dewaxing process. They serve for dilution of the initial mineral oil or the like which is to be treated and also, in relatively large quantities, as a washing liquid in the filtration step of the conventional solvent dewaxing process.

The thus recovered solvents contain water which is partially derived from the initial mineral oil or the like and partially from the steam used for direct heating in the steam distillation steps. The presence of water in the solvent interferes with the smooth operation of the dewaxing device particularly when the recovered solvents are used as washing liquid, since under the conditions prevailing during filtration and washing the water freezes and the ice crystals formed thereby plug up the apparatus.

It has been proposed in accordance with German Patent No. 917,865, to dry the solvents, such as chlorinated hydrocarbons. The solvents are recovered from the filtrate and crude paraffin fraction by step-wise steam distillation and then dried by subjecting the thus-obtained vapors to rectification.

For this purpose, the water-containing solvent vapors from the first steam distillation of the filtrate are introduced into the lower portion of a rectification column which is superposed upon the first filtrate steam distillation device and, in such rectification column, the vapors are separated into a practically water-free liquid fraction and a water-containing vapor fraction. The water-containing vapor fraction is withdrawn from the head of the rectification column and, together with vapors from a third steam distillation stage of the filtrate and from the first steam distillation stage of the crude paraffin fraction then, after condensation and removal of condensed water, recycled into the rectification column, whereas solvent vapors from the second filtrate steam distillation step and the second crude paraffin fraction steam distillation step are directly recycled into the dewaxing device.

The thus recovered solvents, particularly chlorinated hydrocarbons, are practically free of water, however, they do contain traces of paraffin which were introduced into the rectification column together with the vapors derived from the steam distillation of the crude paraffin fraction. These traces of paraffin will thus also be found in the water-free liquid solvent fraction collecting at the bottom portion of the rectification column. Furthermore, paraffin will also be contained in the solvents which are directly recycled from the steam distillation devices into the dewaxing device. Although the proportion of paraffin-containing solvent vapors is small relative to the total amount of solvent vapors which are recovered, the mixing of paraffin-containing with paraffin-free solvent vapors causes the presence of traces of paraffin in the entire amount of recovered liquid solvent.

If the thus obtained, traces of paraffin-containing chlorinated hydrocarbons are used as washing liquid in the dewaxing process, paraffin crystals will be formed in the heat exchangers causing clogging up of the same.

SUMMARY OF THE INVENTION

It is an object of the present invention to recover the solvents of the dewaxing process in a water-free and, to the largest extent thereof, also paraffin-free condition.

This is accomplished in accordance with the present invention by condensing the solvent vapors from the first filtrate evaporation in two stages and to collect the large fraction of water and paraffin-free solvent which is liquefied in the first condenser in a main solvent storage device from which the pure solvent may be recycled into the dewaxing process, whereas the portion of vapors which were not condensed in the first condensation stage and which consists of a solvent and water vapors will be liquefied in a second condensation stage and, after separation of water therefrom, will be introduced into the upper portion of a rectification column, into the lower portion of which the water and paraffin-containing solvent vapors are introduced which are obtained in the first evaporation of the crude paraffin fraction. The water-containing vapors emanating at the head of the rectification column are also introduced into the second condensation stage and the solvent vapors obtained in the last evaporation of the filtrate and the last evaporation of the crude paraffin fraction are, after condensation and separation of water therefrom, also introduced into the head portion of the rectification column. Finally, the water-free but paraffin-containing liquid product accruing in the bottom portion of the rectification column is separately collected and then introduced into the initial mineral oil which is to be dewaxed, for dilution of the latter.

While not limited thereto, the present method is particularly advantageous if carried out in connection with the recovery of solvent mixtures consisting of dichloroethane and methylene chloride.

The novel features which are considered as characteritic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The drawing is schematic illustration of a preferred manner of carrying out the process of the present intion.

DESCRIPTION OF THE PREFERRED EMBODIMENTS

As illustrated in the drawing, solvents, for instance a mixture of dichloroethane and methylene chloride, may be recovered from the end products obtained by dewaxing of mineral oils and the like. However, the following description of the invention with reference to the drawing it is to be taken as illustrative only and not as limiting the invention to the specific details thereof.

As illustrated, the stripping of the solvent from the filtrate and the crude paraffin fraction of the dewaxing process is carried out respectively in two evaporation stages. However, the limitation of the multistage evaporation to only two stages is made only in order to more clearly illustrate the essential first and last evaporation stages, it does not mean that the multi-stage evaporation is always to be limited to two stages. It is within the scope of the present invention to interpose between the first and last evaporation of the filtrate, as well as of the crude paraffin fraction, one or more additional evaporation stages, whereby the condensates of these intermediate stages of the filtrate evaporations eventually will be collected together with the main portion of pure water- and paraffin-free solvent, whereas the condensates of the intermediate stages of the evaporation of the crude paraffin fraction eventually will be collected together with the paraffin-containing solvent fraction.

Referring now to the drawing, the filtrate obtained is the dewaxing process, which filtrate contains solvent, flows through conduit 1 into first filtrate evaporation stage 2. The vapors produced in evaporation stage 2 may consist of 7,200 kg./h. methylene chloride, 800 kg./h. dichloroethane and about 0.8 kg./h. (equal to about 0.01% by weight) water. These vapors pass through conduit 3 into first condensation stage 4. In first condensation stage 4, preferably at an absolute pressure of 1.5 atmospheres and a temperature of between 53° C. and 58.5° C., 7,000 kg./h. water-free and paraffin-free solvent mixture consisting predominantly of methylene chloride will be condensed and passed through conduits 5 to the main solvent collector 6.

The vapors which are not condensed in condenser 4 are withdrawn through conduit 7. These vapors consist of 1,000 kg./h. solvent mixture (predominantly dichloroethane) and about 0.8 kg./h. water.

The solvent-containing crude paraffin fraction is introduced through conduit 8 into the first stage 9 of the evaporation thereof. The steam evolved in evaporation stage 9 consists of 1,800 kg./h. methylene chloride, 200 kg./h. dichloroethane and about 0.2 kg./h. (equal to about 0.01% by weight) water. The thus obtained steam is directly introduced into the lower portion of rectification column 10. A vapor mixture consisting of 2,000 kg./h. solvent and about 13.2 kg./h. water is withdrawn at the head of rectification column 10, through conduit 11. The increase in the amount of water to about 13.2 kg./h. will be explained further below.

The vapor-containing mixture withdrawn through conduit 11 is combined, prior to introduction into second condensation stage 2, with the vapors withdrawn from the first condensation stage 4 through conduit 7. In second condensation stage 12, an absolute pressure of 1.5 atmospheres is maintained and a temperature of between 48° C. and 57° C. In second condensation stage 12, the vapors are completely condensed and the thus formed condensate is then passed into separator 14, by way of conduit 13. In separator 14, the water which is not dissolved in the solvent is separated from the latter. Since about 0.3% by weight of water remains dissolved in the condensed solvent, or for 3,000 kg./h. of solvent mixture about 9 kg./h. of water, about 5 kg./h. water are separated in separator 14 and withdrawn through conduit 15.

The filtrate, after being subjected to first evaporation stage 2, is passed through conduit 16 into the second evaporation stage 17, whereas the crude paraffin from first paraffin evaporation stage 9 is passed through conduit 18 into the second evaporation stage 19. The solvent vapors which are stripped off in evaporation stages 17 and 19 consist predominantly of dichloroethane. These vapors are passed through conduits 20 and 21 into condensing stage 22. The condensate formed therein is separated in separator 23 from the portion of the water which is not dissolved in the solvent.

The solvent mixture which leaves separator 23 through conduit 24 consists of 1,000 kg./h. solvent containing about 0.4% by weight, i.e. about 4 kg./h. of water. Water is removed from separator 23 through conduit 30. The solvent mixture from conduit 24 is combined with the solvent mixture derived from separator 14 and these two solvent mixtures are then jointly introduced through conduit 25 into the top portion of rectification column 10. The entire amount of liquid which is thus introduced into the top portion of rectification column 10 consists of 4,000 kg./h. of solvent mixture and about 13 kg./h. of water.

The thus introduced water is taken up in rectification column 10 by the vapors passing upwardly through the rectification column from first crude paraffin fraction evaporation 9, so that at the lower portion of rectification column 10 a water-free but paraffin-containing solvent is withdrawn through conduit 26 and introduced into second solvent collecting vessel 27.

The solvent free products i.e. mineral oil or the like which has been dewaxed, and the paraffin fraction, are withdrawn through conduits 28 and 29.

It is of course also possible to condense the mixture of solvent vapors and water vapors which emanates from the upper portion of rectification column 10 by introducing the same into first condensing stage 4. However, this will result in an increase in the partial vapor pressure of water and this will reduce the amount of water-free and paraffin-free condensate which can be recovered and withdrawn through conduit 5 to first solvent collecting vessel 6. In view thereof, it is preferred to introduce the vapor mixture emanating from the top portion of rectifier 10 into the second condensation stage 12.

One of the advantages of the present invention will be found in the fact that the overwhelming proportion of the recovered solvent is free of water and paraffin and thus may be introduced into any desired stage of the dewaxing process and preferably used as washing agent in the filtration step of the conventional dewaxing process. The solvent fraction which contains traces of paraffin and collects in vessel 27 may serve for diluting the initial mineral oil, tar or the like which is to be dewaxed.

It is a further advantage of the present invention that the overwhelming portion of the water-free and paraffin-free solvent mixture is directly recovered from the filtrate by evaporation so that the thus-recovered of solvent will not pass through the rectifier column. Consequently a relatively small rectifier column will suffice, even if large amounts of solvent are to be recovered.

The present invention is not restricted to the use of chlorinated hydrocarbons as the solvent, but it is preferred to use low boiling chlorinated hydrocarbons the boiling point of which is not higher than 130° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A method for recovering low boiling solvents selected from the group consisting of dichloroethane and methylene chloride from the solvent-containing filtrate and crude paraffin fractions obtained in the dewaxing of mineral oils, tar, distillation products thereof and the like, by evaporating the solvent from said filtrate and crude paraffin fractions, said method comprising the steps of subjecting said filtrate and said crude paraffin fraction separately to multistage evaporations so as to obtain in each of said evaporations a vapor phase, said multistage evaporations, respectively, including a first and a last stage; subjecting the vapor obtained in the first stage evaporation of said filtrate and consisting essentially of solvent and a minor proportion of water, to a first stage condensation so as to separate said vapors into a liquid phase consisting of at least substantially pure solvent and of residual vapors consisting of a mixture of solvent and water; subjecting said residual vapors to a second stage, substantially complete condensation so as to separate said residual vapors into water and into residual water-containing solvent; subjecting the residual vapors respectively obtained in the last stage of the multi-stage evaporations of said filtrate and of said crude paraffin fraction consisting of a mixture of solvent and water, to condensation and separation into water and water-containing solvent; subjecting the residual vapors of said first of said evaporation stages of said crude paraffin fraction to rectification together with said residual water-containing solvent of said second stage condensation and of the water-containing solvent obtained in the condensation of the residual vapors of the last stages of said evaporations; and introducing the residual vapors of said rectification, consisting of a mixture of solvent and water, into said second stage condensation.

2. A method as defined in claim 1, wherein said evaporations are carried out by steam distillation.

3. A method as defined in claim 1, wherein said first stage condensation is carried out at an absolute pressure of about 1.5 atmospheres and at a temperature between 53 and 58.5° C., and said second stage condensation is carried out at an absolute pressure of about 1.5 atmospheres and at a temperature between 48 and 57° C.

4. A method as defined in claim 3, wherein said evaporations are carried out by steam distillation.

5. A method as defined in claim 4, wherein said multistage steam distillations are two-stage steam distillations consisting of a first and a last stage.

References Cited

UNITED STATES PATENTS

| | | | |
|---|---|---|---|
| 2,129,752 | 9/1938 | Whiteley | 208—33 |
| 2,443,532 | 6/1948 | Berg | 208—33 |
| 2,949,419 | 8/1960 | Benedict | 208—33 |
| 3,067,125 | 12/1962 | Kemp | 208—33 |
| 3,130,143 | 4/1964 | Salmon et al. | 203—79 |
| 3,336,395 | 8/1967 | Price | 203—87 |

FOREIGN PATENTS

| | | |
|---|---|---|
| 917,865 | 9/1954 | Germany. |

WILBUR L. BASCOMB, Jr., *Primary Examiner.*

U.S. Cl. X.R.

23—312; 196—14.5, 14.52; 202—172; 203—14, 77, 79, 80, 87; 208—33, 321; 260—652